US012790985B1

(12) United States Patent
Anthes et al.

(10) Patent No.: US 12,790,985 B1
(45) Date of Patent: Nov. 10, 2026

(54) GAS TURBINE ENGINE WITH EPICYCLIC REDUCTION GEARBOX

(71) Applicant: ROLLS-ROYCE DEUTSCHLAND LTD & CO KG, Blankenfelde-Mahlow (DE)

(72) Inventors: Rainer Anthes, Blankenfelde-Mahlow (DE); Jan Schwarze, Blankenfelde-Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 19/642,105

(22) Filed: Apr. 8, 2026

(30) Foreign Application Priority Data

Oct. 14, 2025 (DE) .................... 10 2025 141 869.1

(51) Int. Cl.
*F02C 7/36* (2006.01)

(52) U.S. Cl.
CPC ...... *F02C 7/36* (2013.01); *F05D 2260/40311* (2013.01)

(58) Field of Classification Search
CPC ............. F02C 7/36; F05D 2260/40311; F05D 2260/4031
See application file for complete search history.

(56) References Cited

U.S. PATENT DOCUMENTS 11,174,916 B2 11/2021 Desjardins
11,313,438 B2 * 4/2022 Spruce .................... F16H 55/08
11,746,876 B2 * 9/2023 Lundbäck ............... F16H 55/17 74/421 R
11,873,767 B2 1/2024 Piazza et al.
12,018,619 B2 * 6/2024 Hrubec ..................... F02K 3/06
12,146,444 B1 11/2024 Desjardins
2015/0354668 A1 12/2015 Bouwer et al.
2019/0291575 A1 9/2019 Rotenberg
2021/0017910 A1 1/2021 Spruce
2021/0017911 A1 1/2021 Spruce
2021/0388770 A1 12/2021 Hrubec et al.
2022/0145806 A1 5/2022 Beck et al.

FOREIGN PATENT DOCUMENTS

WO 2015188187 A1 12/2015

* cited by examiner

*Primary Examiner* — Michael L Sehn
(74) *Attorney, Agent, or Firm* — Oliff PLC

(57) ABSTRACT

A gas turbine engine with an epicyclic reduction gearbox assembly is shown. The epicyclic reduction gearbox assembly includes a sun gear, configured to receive an input rotational movement from an input shaft, a ring gear, configured to provide an output rotational movement to an output shaft, and a plurality of planetary gears, configured to mesh with the sun gear and the ring gear, each one of the plurality of planetary gears being configured as a compound gear, having a first compound section with a first compound section diameter and a first compound section flank width, and a second compound section with a second compound section diameter and a second compound section flank width. A compound flank-width-to diameter-ratio coefficient ε is less than or equal to 0.7, the compound flank-width-to diameter-ratio coefficient being defined as $$\varepsilon = \frac{L_{CS1}}{D_{CS1}} \times \frac{D_{CS2}}{L_{CS2}}.$$

14 Claims, 6 Drawing Sheets

GAS TURBINE ENGINE WITH EPICYCLIC REDUCTION GEARBOX

TECHNICAL FIELD

This disclosure relates to gas turbine engines with an epicyclic reduction gearbox.

BACKGROUND

Epicyclic reduction gearboxes are a means for reducing the speed of an input rotational movement provided at an input shaft to an output rotational movement of decreased speed provided at an output shaft. In particular in the context of gas turbine engines, such a reduction gearbox enables to rotate a fan, which may be coupled to the output shaft, and a lower rotational speed than a driving engine shaft, e.g. a low pressure or intermediate pressure shaft, coupled to the input shaft of the epicyclic reduction gearbox.

SUMMARY

Herein, unless specified otherwise, where a value of a measured or measurable quantity is dependent on measurement conditions such as ambient temperature and pressure, the measurement conditions are ISA (International Standard Atmosphere) sea level conditions. ISA sea level conditions correspond to an ambient temperature of 288 K (15° C., 59° F.) and an ambient pressure of 101.325 kPa (1,013.25 mbar, 14.7 psi).

In a first general aspect, there is provided a gas turbine engine with an epicyclic reduction gearbox assembly, the epicyclic reduction gearbox assembly comprising

- a sun gear with a sun gear diameter, configured to receive an input rotational movement from an input shaft,
- a ring gear with a ring gear diameter, configured to provide an output rotational movement to an output shaft,
- a plurality of planetary gears, configured to mesh with the sun gear and the ring gear.

Each one of the plurality of planetary gears may be configured as a compound gear, comprising a first compound section with a first compound section diameter and a first compound section flank width, and a second compound section with a second compound section diameter and a second compound section flank width.

For some examples, the first compound section may be arranged and configured to mesh with the sun gear, and the second compound section is arranged and configured to mesh with the ring gear.

A compound flank-width-to-diameter-ratio coefficient ε may be less than or equal to 0.7, the compound flank-width-to-diameter-ratio coefficient being defined as $$\varepsilon = \frac{L_{CS1}}{D_{CS1}} \times \frac{D_{CS2}}{L_{CS2}}.$$

The flank widths $L_{CS1}$, $L_{CS2}$ describe the axial extension of the corresponding compound gear sections $CS_1$, $CS_2$. The diameters $D_{CS1}$, $D_{CS2}$ describe the gear pitch diameters, i.e. a radial extension, of the corresponding compound gear sections $CS_1$, $CS_2$. The value of ε may be less than or equal to 0.5, for example in the range from 0.1 to 0.5, or for example in the range from 0.2 to 0.5. The value of ε may be less than or equal to 0.65, less than or equal to 0.6, or less than or equal to 0.55. The value of ε may be greater than or equal to 0.1, greater than or equal to 1.5, or greater than or equal to 0.2. In other words, the compound flank-width-to-diameter-ratio coefficient can be considered the ratio of a L/D ratio for the first compound section $CS_1$, divided by a L/D ratio for the second compound section $CS_2$:

$$\varepsilon = \frac{\frac{L_{CS1}}{D_{CS1}}}{\frac{L_{CS2}}{D_{CS2}}}.$$

The compound flank-width-to-diameter-ratio coefficient ε defines a quotient of the L/D ratio of the first compound section and the second compound section. The L/D ratio is the quotient of the flank width and the diameter of each compound section. It has been found that for a value of ε less than or equal to 0.7, significant advantages can be achieved. Embodiments with a compound flank-width-to-diameter-ratio coefficient ε in the defined range accept a relatively small speed reduction, or even a speed increase, between the sun gear and the first compound section, which may then be compensated by a speed reduction between second compound section and the ring gear. However, it has been found that this results in relatively high rotational speeds of the planet gears, reducing torque and corresponding mesh flank pressure, in particular at the meshing compound sections, when transmitting a given amount of power.

In some examples, the value of $$\frac{L_{CS2}}{D_{CS2}},$$

which is the L/D ratio tor the second compound section, may be less than or equal to 1.2, less than or equal to 1.0, less than or equal to 0.8. In some examples, the value of $$\frac{L_{CS2}}{D_{CS2}}$$

may be greater than or equal to 0.2, greater than or equal to 0.4, greater than or equal to 0.6. Values of $$\frac{L_{CS2}}{D_{CS2}}$$

in such ranges contribute to a compact design whilst enabling a relatively high power and/or torque transfer via the second compound section.

For some examples, the sun gear and/or the input shaft may comprise at its radial center a clearance space with an inner diameter, the clearance space completely protruding axially through the sun gear and/or the input shaft, wherein an installation space coefficient τ is less than or equal to 7, the installation space coefficient τ being defined as $$\tau = \frac{D_R}{D_I}.$$

$D_R$ describes the ring gear diameter. $D_I$ describes the inner diameter of the clearance space. An installation space coefficient $\tau$ in the defined range can in particular be achieved in a compound star configuration, and can help to achieve performance objectives and lightweight design. A through shaft can be accommodated within the clearance space, connecting an engine shaft, in particular a turbine, with a fan of the engine. A through shaft can positively affect engine structural loads, as certain parts of these loads, such as axial loads and/or bending loads, are bypassing the gears and bearings of the gearbox, and are directed through the center via the through shaft instead, helping to reduce detrimental effects on the gearbox, such as strain, bending and/or gear misalignment. Further, an increased inner diameter, for a given ring gear diameter and/or a given input wall thickness, may increase the second moment of area and thus the torque transmitting capability of the input shaft. Further, the ring gear diameter, describing an inner diameter of the ring gear, determines the outer dimensions of the gearbox. The value of $\tau$ may be in the range from 1 to 6.5, or for example in the range from 3 to 6. The value of $\tau$ may be greater than or equal to 1, greater than or equal to 2, greater than or equal to 3, greater than or equal to 3.2, greater than or equal to 3.5, greater than or equal to 4. The value of $\tau$ may be less than or equal to 8, less than or equal to 7, less than or equal to 6.5, less than or equal to 6, less than or equal to 5.5, less than or equal to 5, less than or equal to 4.5, less than or equal to 4.

For some examples, the first compound section may be arranged and configured to mesh with the sun gear at a first gear sub-ratio, and the second compound section is arranged and configured to mesh with the ring gear at a second gear sub-ratio, wherein a gear ratio spread coefficient $\eta$ is greater than or equal to 4, the gear ratio spread coefficient $\eta$ being defined as $$\eta = \frac{i_2}{i_1}.$$

The value of $\eta$ may be in the range from 1 to 15, or in the range from 4 to 12, or in the range from 8 to 11. The value of $\eta$ may be greater than or equal to 4, greater than or equal to 5, greater than or equal to 6, greater than or equal to 8, greater than or equal to 8.5, greater than or equal to 9, greater than or equal to 9.5, greater than or equal to 10. The value of $\eta$ may be less than or equal to 15, less than or equal to 12, less than or equal to 11, less than or equal to 10, less than or equal to 9.5, less than or equal to 9, less than or equal to 8.5. For a given overall gear ratio i of the epicyclic reduction gearbox assembly, examples with a gear ratio spread coefficient $\eta$ in the defined range realize a relatively small speed reduction or a speed increase, between the sun gear and the first compound section $CS_1$, characterized by a relatively small first gear sub-ratio $i_1$. In order to achieve a desired, in particular higher, overall gear ratio i, the second gear sub-ratio $i_2$ can be configured accordingly higher, resulting in a higher speed reduction, to compensate the first gear sub-ratio $i_1$. Such examples result in relatively high rotational speeds of the planet gears, and consequently, lower torque when transmitting a given amount of power.

For some examples, a compound diameter ratio coefficient $\sigma$ may be less than or equal to 1.5, the compound diameter ratio coefficient $\sigma$ being defined as $$\sigma = \frac{D_R}{D_S} \times \frac{D_{CS2}}{D_{CS1}}.$$

The compound diameter ratio coefficient $\sigma$ defines the product of a first quotient of ring gear diameter $D_R$ and sun gear diameter $D_S$, and a second quotient of second compound section diameter $D_{CS2}$ and first compound section diameter $D_{CS1}$. Due to the design parameters of the present gearbox design, both quotients assume relatively low values, compared to conventional gearbox designs. In other words, with the specific combination of a relatively small ring gear diameter with a relatively large sun gear diameter on the one hand, and the relatively small second compound section diameter with a relatively large first compound section diameter, larger speed reductions can be achieved in a given installation space and/or under aerodynamic requirements of the gas turbine engine. The value of $\sigma$ may be in the range from 0.3 to 1.5, or in the range from 0.4 to 1.4, or in the range from 0.5 to 1.35. The value of $\sigma$ may be greater than or equal to 0.2, greater than or equal to 0.3, greater than or equal to 0.4, greater than or equal to 0.5, greater than or equal to 0.6, greater than or equal to 0.7, greater than or equal to 0.8, greater than or equal to 0.9, greater than or equal to 1.0, greater than or equal to 1.1. The value of $\sigma$ may be less than or equal to 1.7, less than or equal to 1.6, less than or equal to 1.5, less than or equal to 1.4, less than or equal to 1.3, less than or equal to 1.2, less than or equal to 1.1.

In a second general aspect, an epicyclic reduction gearbox assembly is provided, in particular configured for a gas turbine engine according to the first general aspect.

In a third general aspect, an aircraft, with one or more gas turbine engines according to the first general aspect, is provided.

Values for gear diameter, unless noted otherwise, refer to the corresponding pitch circle diameter (PCD).

The gearbox assembly may be configured as a star, in particular in a compound star, type. In such configuration, the planet gears, in particular compound type planet gears, are arranged rotatably around a planetary axis in a stationary planet carrier. In other words, the planetary axis is in a fixed position with relation to a rotational axis of the sun gear and/or input shaft.

The first compound section may be arranged axially aft, in particular on an input side of the gearbox assembly, e.g. facing an input shaft from the gas turbine engine. The second compound section may be arranged axially fore, in particular on an output side of the gearbox assembly, e.g. facing a fan of the gas turbine engine.

The gas turbine engine may include a fan having a fan diameter. The fan diameter may be less than or equal to 160 inches, less than or equal to 110 inches, less than or equal to 100 inches, less than or equal to 95 inches. The fan diameter may be greater than or equal to 40 inches, greater than or equal to 50 inches, greater than or equal to 60 inches, greater than or equal to 70 inches, greater than or equal to 80 inches. For some examples, the fan diameter may be in the range from 80 inches to 95 inches.

The fan may comprise a plurality of fan blades. The number of fan blades may be from 9 to 28, for example from 12 to 24 blades, or from 14 to 22 blades, or from 18 to 24 blades, or from 10 to 16 blades. The gas turbine engine may further comprise a plurality of outlet guide vanes axially downstream of the fan. The number of outlet guide vanes may be the same as the number of fan blades, or it may be less than the number of fan blades, or it may be more than the number of fan blades. The number of outlet guide vanes may be from 6 to 25 vanes, or from 9 to 21 vanes, or from 11 to 19 vanes, or from 15 to 21 vanes, or from 7 to 13 vanes. The number of outlet guide vanes may be from 6 to 25 vanes, or from 9 to 21 vanes, or from 11 to 19 vanes of from 15 to 21 vanes, or from 7 to 13 vanes. Also, the number of outlet guide vanes may be from 20 to 58 vanes, or from 26 to 50 vanes, or from 38 to 50 vanes, or from 32 to 44 vanes, or from 16 to 28 vanes.

The gas turbine engine may be a geared turbofan engine.

An overall gear ratio i of the gearbox assembly may be greater than or equal to 2.5, greater than or equal to 2.7, greater than or equal to 2.9, greater than or equal to 3.0, greater than or equal to 3.2, greater than or equal to 3.3. A gear ratio greater than 1 results in a speed reduction. The overall gear ratio i of the gearbox assembly may be less than or equal to 11, less than or equal to 9, less than or equal to 8, less than or equal to 6, less than or equal to 4.5, less than or equal to 4.2, less than or equal to 4.0, less than or equal to 3.8, less than or equal to 3.7, less than or equal to 3.5, less than or equal to 3.4.

A first gear sub-ratio $i_1$, resulting from a meshing of the sun gear with the first compound section, may be in the range from 0.3 to 1.5, from 0.4 to 1.2, from 0.5 to 1.0. The first gear sub-ratio $i_1$ may be greater than or equal to 0.3, greater than or equal to 0.4, greater than or equal to 0.5, greater than or equal to 0.6, greater than or equal to 0.7. The first gear sub-ratio $i_1$ may be less than or equal to 1.5, less than or equal to 1.4, less than or equal to 1.3, less than or equal to 1.2, less than or equal to 1.1, less than or equal to 1.0, less than or equal to 0.9, less than or equal to 0.8, less than or equal to 0.7, less than or equal to 0.6.

A second gear sub-ratio $i_2$, resulting from a meshing of the second compound section and the ring gear, may be in the range from 3 to 8, in the range from 4 to 7, in the range from 5 to 6.5. The second gear sub-ratio $i_2$ may be greater than or equal to 3, greater than or equal to 4, greater than or equal to 5, greater than or equal to 6, greater than or equal to 7. The second gear sub-ratio $i_2$ may be less than or equal to 9, less than or equal to 8, less than or equal to 7, less than or equal to 6.

The gearbox assembly may be configured to receive a gearbox input power, in particular a maximum gearbox input power, provided at the input shaft of the gearbox assembly, in particular by the gas turbine engine, at maximum take off (MTO) conditions, e. g. according to FAA type certificate data sheet specification ("rated takeoff"). The gearbox input power may be greater than or equal to 12 MW (Megawatt), greater than or equal to 15 MW, greater than or equal to 18 MW, greater than or equal to 20 MW, greater than or equal to 30 MW, greater than or equal to 40 MW, greater than or equal to 60 MW. The gearbox input power may be less than or equal to 80 MW, less than or equal to 60 MW, less than or equal to 40 MW, less than or equal to 30 MW, less than or equal to 25 MW, less than or equal to 22 MW, less than or equal to 20 MW, less than or equal to 15 MW.

The number PN of planetary gears may be greater than or equal to 3, greater than or equal to 5, greater than or equal to 6, greater than or equal to 7, greater than or equal to 8. The number of planetary gears may be less than or equal to 12, less than or equal to 10, less than or equal to 9, less than or equal to 8, less than or equal to 7, less than or equal to 6.

In some examples, the gas turbine engine may include a ducted fan. In other examples, the gas turbine engine may include an open fan.

The first compound section may comprise a first, in particular helical, gearing that is different from a second, in particular helical, gearing of the second compound section. The gearing of the first compound section and the second compound section may differ in helical angle and/or gear module. In particular, the first compound section may have a first helical angle that is different from a second helical angle of the second compound section.

The first compound section diameter, i. e. the gear pitch diameter of the first compound section, may be in the range from 130 mm to 190 mm, from 135 mm to 180 mm, from 140 mm to 170 mm. The first compound section diameter may be greater than or equal to 100 mm, greater than or equal to 105 mm, greater than or equal to 110 mm, greater than or equal to 115 mm, greater than or equal to 120 mm, greater than or equal to 130 mm, greater than or equal to 140 mm. The first compound section diameter may be less than or equal to 320 mm, less than or equal to 310 mm, less than or equal to 300 mm, less than or equal to 250 mm, less than or equal to 200 mm, less than or equal to 180 mm, less than or equal to 160 mm, less than or equal to 150 mm, less than or equal to 140 mm, less than or equal to 130 mm, less than or equal to 120 mm.

The second compound section diameter, i. e. the gear pitch diameter of the second compound section, may be in the range from 70 mm to 100 mm, from 75 mm to 95 mm, from 80 mm to 90 mm. The second compound section diameter may be greater than or equal to 40 mm, greater than or equal to 50 mm, greater than or equal to 60 mm, greater than or equal to 70 mm, greater than or equal to 80 mm, greater than or equal to 90 mm, greater than or equal to 100 mm. The second compound section diameter may be less than or equal to 200 mm, less than or equal to 180 mm, less than or equal to 160 mm, less than or equal to 140 mm, less than or equal to 120 mm, less than or equal to 100 mm, less than or equal to 80 mm.

A first compound section flank width, i.e. an axial length of the first compound section, may be in the range from 30 mm to 60 mm, from 35 mm to 55 mm, from 40 mm to 50 mm. The first compound section flank width may be greater than or equal to 15 mm, greater than or equal to 20 mm, greater than or equal to 25 mm, greater than or equal to 30 mm, greater than or equal to 40 mm, greater than or equal to 50 mm, greater than or equal to 60 mm, greater than or equal to 70 mm, greater than or equal to 80 mm, greater than or equal to 100 mm. The first compound section flank width may be less than or equal to 200 mm, less than or equal to 180 mm, less than or equal to 150 mm, less than or equal to 120 mm, less than or equal to 100 mm, less than or equal to 80 mm, less than or equal to 60 mm, less than or equal to 50 mm, less than or equal to 40 mm.

A second compound section flank width, i.e. an axial length of the second compound section, may be in the range from 30 mm to 90 mm, from 45 mm to 80 mm, from 60 mm to 70 mm. The second compound section flank width may be greater than or equal to 30 mm, greater than or equal to 40 mm, greater than or equal to 50 mm, greater than or equal to 60 mm, greater than or equal to 70 mm, greater than or equal to 80 mm. The second compound section flank width may be less than or equal to 180 mm, less than or equal to 160 mm, less than or equal to 140 mm, less than or equal to 120 mm, less than or equal to 100 mm, less than or equal to 90 mm, less than or equal to 80 mm.

A net engine thrust of the gas turbine engine may be in the range from 15 klbf (kilo pound-force) to 35 klbf, from 17 klbf to 33 klbf, from 19 klbf to 31 klbf. The net engine thrust may be greater than or equal to 10 klbf, greater than or equal to 12 klbf, greater than or equal to 15 klbf, greater than or equal to 17 klbf, greater than or equal to 20 klbf, greater than or equal to 25 klbf, greater than or equal to 28 klbf, greater than or equal to 30 klbf, greater than or equal to 50 klbf, greater than or equal to 70 klbf, greater than or equal to 80 klbf. The net engine thrust may be less than or equal to 100 klbf, less than or equal to 90 klbf, less than or equal to 80 klbf, less than or equal to 70 klbf, less than or equal to 60 klbf, less than or equal to 40 klbf, less than or equal to 35 klbf, less than or equal to 30 klbf, less than or equal to 25 klbf, less than or equal to 22 klbf, less than or equal to 17 klbf.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
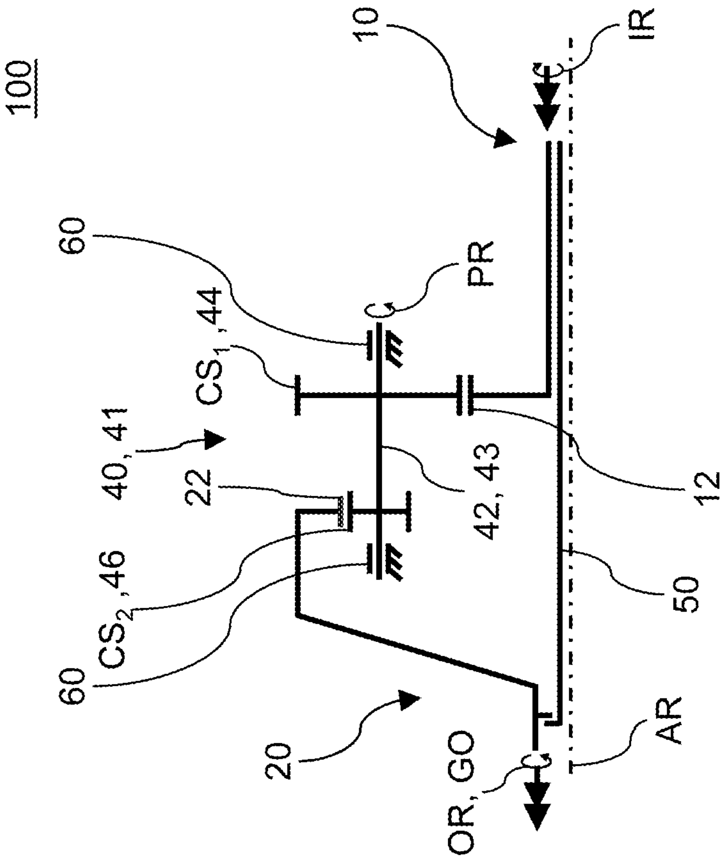
FIG. 1 shows a schematic drawing of an epicyclic gearbox.

FIG. 1 shows a schematic drawing of an epicyclic gearbox 100. The epicyclic gearbox 100 comprises an input shaft 10, configured to receive an input rotational movement IR, and an output shaft 20, configured to provide an output rotational movement OR. The input shaft 10 comprises a sun gear 12. The output shaft 20 extends radially and axially in a flange-like manner and comprises at its aft end a ring gear 22. The input shaft 10 and the output shaft 20 are arranged rotatably with respect to a rotational axis AR. Further, a planetary stage 40, comprising a plurality of planetary gears 42 (one of which is shown here), is arranged axially and radially between the input shaft 10 and a ring section of the output shaft 20. The planetary stage 40 is configured as a compound planetary stage 41. Accordingly, each one of the plurality of planetary gears 42 is configured as a compound planetary gear, comprising a first compound section $CS_1$, which is arranged and configured to mesh with the input gear 12, and a second compound section $CS_2$, which is arranged and configured to mesh with the output gear 22. The first compound section is arranged aft of the second compound section $CS_2$, on the side of the input shaft 10. Each one of the plurality of planetary gears 42 are arranged rotatably on a stationary planet carrier 60. The planetary gears 42 are counter-rotating with respect to the input shaft 10. In other words, the input rotational movement IR is opposing a planetary rotational movement PR of the planetary gears 42. The output shaft 20 is counter-rotating with respect to the input shaft 10. In other words, the input rotational movement IR and the output rotational movement OR are of opposing rotation directions. The input shaft 10 is configured as a hollow shaft and comprises at its radial center a clearance space 14. The clearance space 14 can accommodate a through shaft 50, which is useful for transferring axial loads, e.g. between the output shaft 20 and the input shaft 10 or between other parts of the gas turbine engine 1000. Via such through shaft 50, a more direct load transfer can be achieved. This is particularly beneficial in aircraft engines where the engine structure, and hence the gearbox, may be subjected to G-loads during service.

Figure 2:
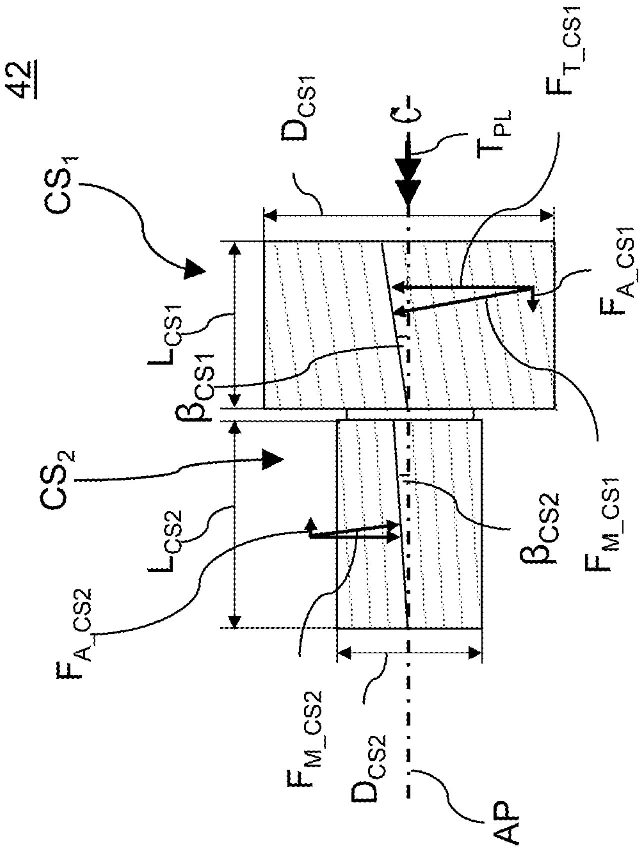
FIG. 2 shows a schematic drawing of a planetary gear of the epicyclic gearbox of FIG. 1.

FIG. 2 shows a schematic drawing of a planetary gear 42, configured as a compound planetary gear with a first compound section $CS_1$ and, axially adjacent, a second compound section $CS_2$. The first compound section $CS_1$ is configured to mesh with the sun gear 12 (not shown here). The second compound section $CS_2$ is configured to mesh with the ring gear 22 (not shown here). The first and second compound sections $CS_1$, $CS_2$ are fixed together, e.g. manufactured integrally from one part or joined together, so as to rotate together in a planetary rotational movement PR. The first compound section $CS_1$ comprises a first compound section diameter $D_{CS1}$, and a first compound section flank width $L_{CS1}$. The second compound section $CS_2$ comprises a second compound section diameter $D_{CS2}$, and a second compound section flank width $L_{CS2}$. The flank widths $L_{CS1}$, $L_{CS2}$ thus determine the axial extension of the corresponding compound gear sections $CS_1$, $CS_2$, whereas the diameter $D_{CS1}$, $D_{CS2}$ determines its radial extension. In both, axial and radial, directions, further distances may contribute to the corresponding extension, such as manufacturing-related gaps, e. g. between the first and second compound section in axial direction for machining gear teeth. In particular, an axial gap between the first compound section $CS_1$ and the second compound section $CS_2$ may be provided, e.g. to allow for machining of the individual gear features of each compound section $CS_1$, $CS_2$.

The sun gear 12 (not shown here) exerts a first meshing force $F_{M\_CS1}$ on the first compound section $CS_1$. Through the first meshing force $F_{M\_CS1}$, a planetary torque $T_{PL}$ is acting on the planetary gear 42. In addition to the first meshing force $F_{M\_CS1}$, the planetary torque $T_{PL}$ is further dependent from the first compound section diameter $D_{CS1}$.

As the first compound section $CS_1$ comprises a helical gearing with a first helical angle $\beta_{CS1}$, the first meshing force $F_{M\_CS1}$ can be divided into a first axial meshing force component $F_{A\_CS1}$ and a first tangential meshing force component $F_{T\_CS1}$. In particular, the first tangential meshing force component $F_{T\_CS1}$ results in the planetary torque $T_{PL}$. The second compound section $CS_2$ comprises a helical gearing with a second helical angle $\beta_{CS2}$. Accordingly, the second compound section $CS_2$ exerts a second meshing force $F_{M\_CS2}$ on the ring gear 22 (not shown here). As the planetary torque $T_{PL}$ is the same for both compound sections $CS_1$, $CS_2$, the first and second helical angle $\beta_{CS1}$, $\beta_{CS2}$ may be chosen such that the first and second axial meshing force components $F_{A\_CS1}$, $F_{A\_CS2}$ cancel each other out fully or partially. For example, a full cancellation would be achieved if the first and second axial meshing force components $F_{A\_CS1}$, $F_{A\_CS2}$ are equal in amount, but oriented in opposing directions. In that case they can be described by the following equation:

$$F_{A\_CS1} = F_{A\_CS2}$$

$$\frac{2 \times T_{PL} \times \sin\beta_{CS1}}{D_{CS1}} = \frac{2 \times T_{PL} \times \sin\beta_{CS2}}{D_{CS2}}$$

$$\frac{\sin\beta_{CS1}}{D_{CS1}} = \frac{\sin\beta_{CS2}}{D_{CS2}}.$$

In some examples, the first and second helical angles may be determined such that an axial bias force $F_{bias}$ remains during operation, i.e. meshing of the gears. This can help to prevent load changes, in particular from one axial direction to the other, which could be caused by axial force variation resulting from e. g. manufacturing tolerances, angular misalignment, and/or bearing clearances.

$$F_{A\_CS1} = F_{A\_CS2} + F_{bias}$$

The axial bias force $F_{bias}$ may be chosen in relation to the first and/or second axial meshing force components $F_{A\_CS1}$, $F_{A\_CS2}$, in particular as a percentage value less than or equal to 25%, less than or equal to 15%, less than or equal to 10%, less than or equal to 5%, or less than or equal to 1% of the first and/or second axial meshing force component $F_{A\_CS1}$, $F_{A\_CS2}$.

Figure 3:
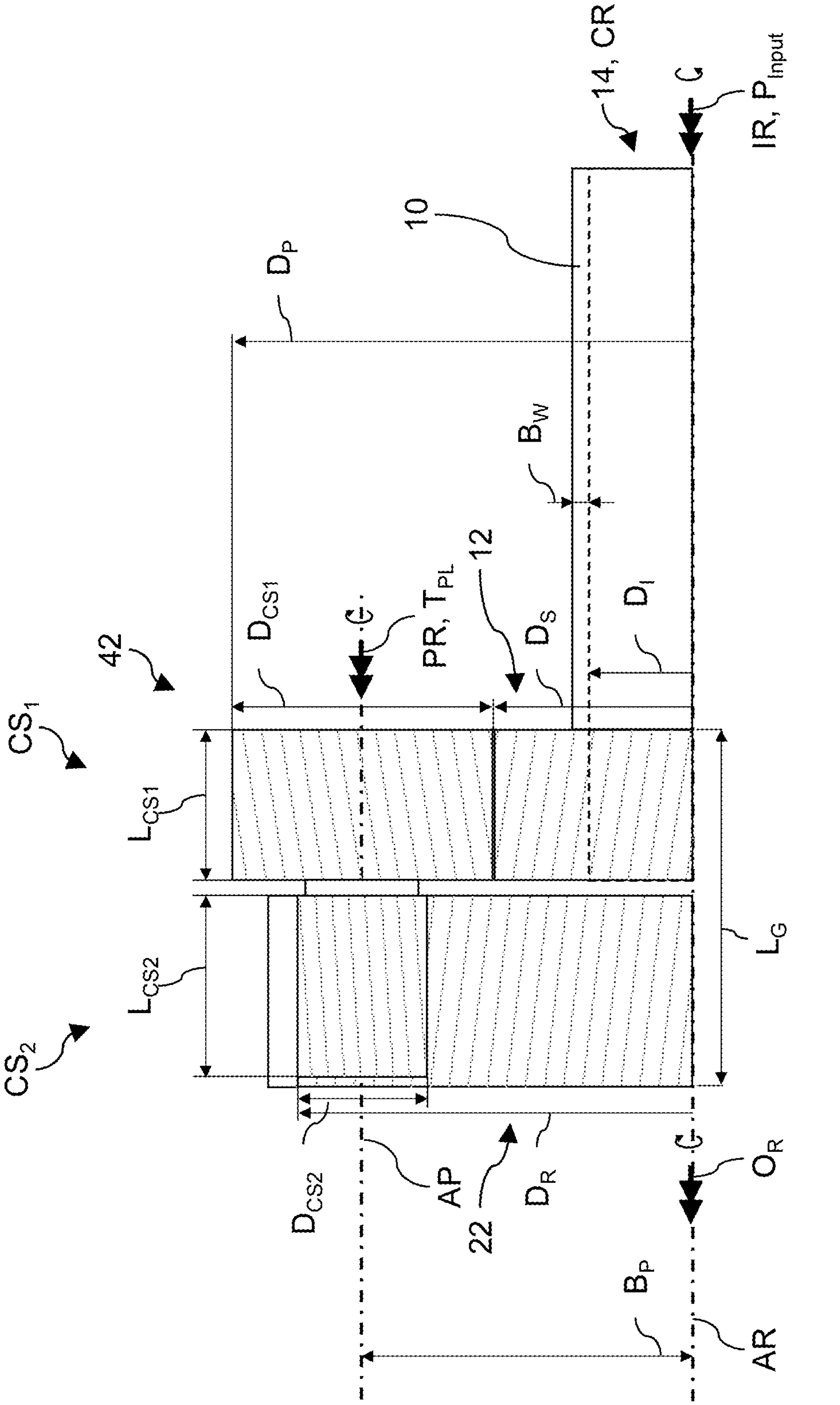
FIG. 3 shows a schematic cross sectional side view of the epicyclic gearbox of FIG. 1.

Turning now to FIG. 3, an example of an epicyclic reduction gearbox assembly 100 is shown, comprising a plurality of planetary gears 42, one of which is shown here. A sun gear 12, which is coupled to an input shaft 10, is arranged rotatably around a rotational axis AR. The input shaft 10 is coupled to a gas turbine engine 1000 (not shown here), for receiving an input rotational movement IR. In the present case, the input shaft 10 is coupled to an intermediate pressure shaft (not shown here), which again is coupled to an intermediate pressure turbine. In other examples, the input shaft could be coupled to a different shaft, e. g. a low-pressure shaft of the gas turbine engine. The input shaft 10 comprises an inner radial clearance space 14, which protrudes axially through the complete input shaft 10 (including the sun gear 12), such that the input shaft 10 is a hollow shaft, with an input shaft wall thickness $B_W$. In the present example, the clearance space 14 is of cylindrical shape, with an inner clearance space diameter $D_I$. Such clearance space 14 enables the accommodation of a through shaft. Further, such hollow shaft saves weight. An increasing inner diameter $D_I$ further increases the torque transfer capability of the input shaft 10. The sun gear 12 comprises a helical gear with a helical angle corresponding to the first helical angle $\beta_{CS1}$ of the first compound section $CS_1$. A ring gear 22 is arranged rotatably around the rotational axis AR, axially forward of the sun gear 12. The ring gear 22 comprises an internal helical gear and is configured to mesh with the second compound section $CS_2$ of the planetary gear 42. The ring gear 22 comprises a helical angle corresponding to the second helical angle $\beta_{CS2}$ of the second compound section $CS_2$. The present epicyclic gearbox assembly 100 comprises a plurality of seven planetary gears 42. In other examples, the amount of planetary gears can be higher, e. g. 9, or lower, e. g. 5. Each planetary gear 42 is arranged in a planet carrier 60 (not shown here), rotatably around a planetary axis AP. Each planetary axis AP is distanced from the rotational axis AR at a planet axis distance $B_P$. Each planetary gear 42 is arranged on a circumference around the rotational axis AR (with a radius corresponding to the planet axis distance $B_P$), equally distanced from each other around a circumference.

The compound flank-width-to-diameter-ratio coefficient ε defines a quotient of the L/D ratio of the first compound section and the second compound section. The L/D ratio is the quotient of the flank width and the diameter of each gear/compound section. It has been found that for a value of ε less than or equal to 0.7, significant advantages can be achieved. Geometrically, the parameter implies that the axial length of the first compound section $CS_1$—in relation to the first compound section diameter $D_{CS1}$—is at max 70% of the axial length of the second compound section $CS_2$—in relation to the second compound section diameter $D_{CS2}$.

In particular, some examples may have planetary gears 42 with a first compound section diameter $D_{CS1}$ that is larger than the second compound section diameter $D_{CS2}$. Such examples accept a relatively small speed reduction, or even a speed increase, between the sun gear 12 and the first compound section $CS_1$, which may then be compensated by the speed reduction between second compound section $CS_2$ and the ring gear 22. This results in relatively high rotational speeds of the planet gears, reducing torque and corresponding mesh flank pressure when transmitting a given amount of power. Through a relatively large first compound section diameter $D_{CS1}$, a flank width $L_{CS1}$ of the first compound section can be kept relatively small. By accepting a speed increase, or only low speed decrease, the relatively high rotational speed of the planet gears further allows for a relatively small second compound section flank width $L_{CS2}$, in particular for a given transmittable power and/or second compound section diameter $D_{CS2}$. As the second compound section flank width $L_{CS2}$ is a main contributor to a gearbox length LG of the gearbox assembly, designs described herein allow for a shorter gearbox.

Table 1 shows values of ε for several series of examples based on computer modeling. The column labelled "No. of examples" denote the amount of possible individual design parameter combinations for each example series I to IX, that fulfil the desired design requirements, in particular gear ratio i and ring gear diameter $D_R$. The example series I to XI are consistently referred to in Tables 1, 2, 4 and 5, while Table 3 refers to alternative designs of a planetary configuration for comparison purposes. The roman numerals refer to identical series of examples described in the following tables. Each series includes a number of examples, as noted in the third column of Table 1.

TABLE 1

Compound flank-width-to-diameter-ratio coefficient ε

| Example series No. | i Gear ratio | No. of examples | $D_R$ Ring gear diameter [mm] | $L_{CS1}/D_{CS1}$ Min | $L_{CS1}/D_{CS1}$ Average | $L_{CS1}/D_{CS1}$ Max | $L_{CS2}/D_{CS2}$ Min | $L_{CS2}/D_{CS2}$ Average | $L_{CS2}/D_{CS2}$ Max | ε Min | ε Average | ε Max |
|---|---|---|---|---|---|---|---|---|---|---|---|---|
| I | 3.4 | 26 | 480 | 0.291 | 0.335 | 0.364 | 0.618 | 0.792 | 0.896 | 0.365 | 0.425 | 0.497 |
| II | 3.7 | 6 | 480 | 0.299 | 0.327 | 0.341 | 0.681 | 0.780 | 0.873 | 0.366 | 0.422 | 0.478 |
| III | 3.7 | 29 | 525 | 0.239 | 0.260 | 0.288 | 0.588 | 0.770 | 0.894 | 0.276 | 0.341 | 0.471 |
| IV | 4 | 3 | 480 | 0.299 | 0.313 | 0.324 | 0.801 | 0.833 | 0.895 | 0.352 | 0.376 | 0.405 |
| V | 4 | 27 | 565 | 0.197 | 0.214 | 0.235 | 0.424 | 0.729 | 0.898 | 0.223 | 0.301 | 0.471 |
| VI | 3.7 | 12 | 900 | 0.335 | 0.345 | 0.359 | 0.691 | 0.792 | 0.981 | 0.355 | 0.441 | 0.502 |
| VII | 7 | 24 | 550 | 0.218 | 0.260 | 0.278 | 0.571 | 0.844 | 0.981 | 0.249 | 0.317 | 0.481 |
| VIII | 7 | 5 | 1000 | 0.078 | 0.142 | 0.389 | 0.864 | 0.952 | 1.029 | 0.076 | 0.150 | 0.415 |
| IX | 10 | 10 | 750 | 0.057 | 0.067 | 0.070 | 0.695 | 0.952 | 1.094 | 0.223 | 0.375 | 0.502 |

The installation space coefficient τ defines the ratio of inner diameter of the clearance space and the ring gear diameter of an epicyclic reduction gearbox assembly. The specific combination of inner diameter and ring gear diameter, in particular a relatively large inner diameter for a given ring gear diameter, may be realized by a gearbox architecture with planetary gears being configured as compound gears in a star arrangement (known as a "compound star"). An installation space coefficient τ in the defined range can help to achieve performance objectives and lightweight design. In particular, a through shaft may be accommodated within the clearance space. Such a through shaft may be configured to transfer axial loads, e.g. from a fan shaft on an output side of the gearbox assembly to an engine shaft, in particular a low pressure or intermediate pressure shaft (spool), of the gas turbine engine on the input side of the gearbox. Table 2 shows values of τ for several series of examples based on computer modeling. Table 2 demonstrates how compound star configurations within the defined τ range correspond to structurally safe sun gear and/or input shaft designs compatible with through-shaft load paths, in particular compared to the examples of a planetary configuration with comparable gear ratios i, but higher values of τ, as shown in Table 3. A smaller value for τ, in particular less than or equal to 7, results in designs that are compact (i. e. with a relatively small ring gear diameter), yet enable the safe transfer of relatively high torque due to a relatively large inner diameter (and accordingly, a relatively large sun gear diameter). This effect can even be enhanced in embodiments with values for τ less than or equal to 4.5.

TABLE 2

Installation space coefficient T

| Example Series No. | i Gear ratio | $D_R$ Ring gear diameter [mm] | Ds Average sun gear diameter [mm] | $D_I$ Inner space clearance diameter [mm] | T |
|---|---|---|---|---|---|
| I | 3.4 | 480 | 243 | 123 | 3.914 |
| II | 3.7 | 480 | 242 | 122 | 3.950 |
| III | 3.7 | 525 | 270 | 150 | 3.492 |
| IV | 4 | 480 | 244 | 124 | 3.884 |
| V | 4 | 565 | 295 | 175 | 3.231 |
| VI | 3.7 | 900 | 450 | 300 | 3.003 |
| VII | 7 | 550 | 206 | 86 | 6.393 |
| VIII | 7 | 1000 | 383 | 233 | 4.287 |
| IX | 10 | 750 | 296 | 176 | 4.258 |

Table 3 shows exemplary values of τ for comparable epicyclic reduction gearbox assembly examples with a planetary configuration, based on computer modeling. In a planetary configuration—in contrast to a star configuration, or the compound star configuration of Table 2—the planet gears are arranged in a rotatable planet carrier, wherein the planet carrier is coupled to an output shaft, and the ring gear is stationary.

TABLE 3

Installation space coefficient T for planetary configuration

| Example Series No. | Gear ratio | $D_R$ Ring gear diameter [mm] | $D_S$ Average sun gear diameter [mm] | $D_I$ Inner clearance space diameter [mm] | T |
|---|---|---|---|---|---|
| I* | 3.4 | 480 | 200 | 80 | 6.000 |
| II* | 3.7 | 480 | 178 | 58 | 8.308 |
| III* | 3.7 | 525 | 194 | 74 | 7.052 |
| IV* | 4 | 480 | 160 | 40 | 12.00 |
| V* | 4 | 565 | 188 | 68 | 8.268 |

The gear ratio spread coefficient η defines the ratio of a first gear sub-ratio $i_1$, realized by the meshing of the sun gear 12 and the first compound section $CS_1$, and a second gear sub-ratio $i_2$, realized by the second compound section $CS_2$ and the ring gear 22. For a given overall gear ratio i of the epicyclic reduction gearbox assembly, examples with a gear ratio spread coefficient η in the defined range realize a relatively small speed reduction or a speed increase, between the sun gear 12 and the first compound section $CS_1$, characterized by a relatively small first gear sub-ratio $i_1$. In order to achieve a desired, in particular higher, overall gear ratio i, the second gear sub-ratio 2 can be configured accordingly higher, resulting in a higher speed reduction, to compensate the first gear sub-ratio $i_1$. Table 4 shows values of η for several series of examples based on computer modeling, demonstrating how a combination of relatively low first gear sub-ratio $i_1$ and relatively high second gear sub-ratio $i_2$, results in a desired overall gear ratio i, whilst achieving a relatively high rotational speed Np of the planet gears, reducing torque and flank pressure acting on the compound sections of the planet gears.

TABLE 4

Gear ratio spread coefficient η

| Example Series No. | i Gear ratio | $D_R$ Ring gear diameter [mm] | $i_1$ First gear sub-ratio | $i_2$ Second gear sub-ratio | $N_I$ Input rotational speed[1/min] | $N_O$ Output rotational speed[1/min] | $N_P$ Planet rotational speed[1/min] | η |
|---|---|---|---|---|---|---|---|---|
| I | 3.4 | 480 | 0.620 | 5.514 | 9600 | 2824 | 15494 | 8.899 |
| II | 3.7 | 480 | 0.643 | 5.762 | 9600 | 2595 | 14938 | 8.966 |
| III | 3.7 | 525 | 0.619 | 6.016 | 9600 | 2595 | 15502 | 9.714 |
| IV | 4 | 480 | 0.650 | 6.151 | 9600 | 2400 | 14762 | 9.459 |
| V | 4 | 565 | 0.621 | 6.486 | 9600 | 2400 | 15453 | 10.440 |
| VI | 3.7 | 900 | 0.652 | 5.719 | 9600 | 2580 | 14735 | 8.778 |
| VII | 7 | 550 | 1.210 | 5.796 | 9600 | 1371 | 7936 | 4.791 |
| VIII | 7 | 1000 | 1.177 | 5.990 | 9600 | 1371 | 8159 | 5.091 |
| IX | 10 | 750 | 1.225 | 8.186 | 9600 | 960 | 7840 | 6.685 |

The compound diameter ratio coefficient σ defines the product of a first quotient of ring gear and sun gear diameter, and a second quotient of second and first compound section diameter. Due to the design parameters of the present gearbox design, both quotients assume relatively low values, compared to conventional gearbox designs. In other words, with the specific combination of a relatively small ring gear diameter with a relatively large sun gear diameter on the one hand, and the relatively small second compound section diameter with a relatively large first compound section diameter, larger speed reductions can be achieved in a given installation space and/or under aerodynamic requirements of the gas turbine engine. The installation space may be defined by an annulus line of the gas turbine engine, in particular between an engine core inlet and a compressor inlet. Table 5 shows values of σ for several series of examples based on computer modeling. Table 5 shows that values of σ in the defined range, in particular less than or equal to 1.5, characterize gearbox designs highly suitable for aerospace application, as it defines a high transfer capability (through a relatively large sun gear diameter) under compact dimensions (through a relatively small ring gear diameter), wherein the ability to achieve a desired overall gear ratio is maintained by a relatively small second compound stage diameter, and a relatively large first compound stage diameter.

TABLE 5

| Compound diameter ratio coefficient σ | | | | | | | | | | | |
|---|---|---|---|---|---|---|---|---|---|---|---|
| Example Series No. | i Gear ratio | $D_R$ Ring gear diameter [mm] | $D_R/D_S$ Min | $D_R/D_S$ Average | $D_R/D_S$ Max | $D_{CS2}/D_{CS1}$ Min | $D_{CS2}/D_{CS1}$ Average | $D_{CS2}/D_{CS1}$ Max | σ min (min/max) | σ Average | σ max (max/min) |
| I | 3.4 | 480 | 1.805 | 1.982 | 2.111 | 0.530 | 0.582 | 0.621 | 0.957 | 1.157 | 1.310 |
| II | 3.7 | 480 | 1.952 | 1.988 | 2.026 | 0.527 | 0.537 | 0.548 | 1.029 | 1.068 | 1.110 |
| II | 3.7 | 525 | 1.744 | 1.946 | 2.078 | 0.472 | 0.525 | 0.561 | 0.823 | 1.026 | 1.167 |
| IV | 4 | 480 | 1.964 | 1.971 | 1.975 | 0.491 | 0.493 | 0.494 | 0.964 | 0.971 | 0.974 |
| V | 4 | 565 | 1.742 | 1.920 | 2.044 | 0.436 | 0.479 | 0.511 | 0.759 | 0.924 | 1.044 |
| VI | 3.7 | 900 | 1.911 | 2.003 | 2.091 | 0.513 | 0.538 | 0.563 | 0.981 | 1.079 | 1.177 |

Figure 4:
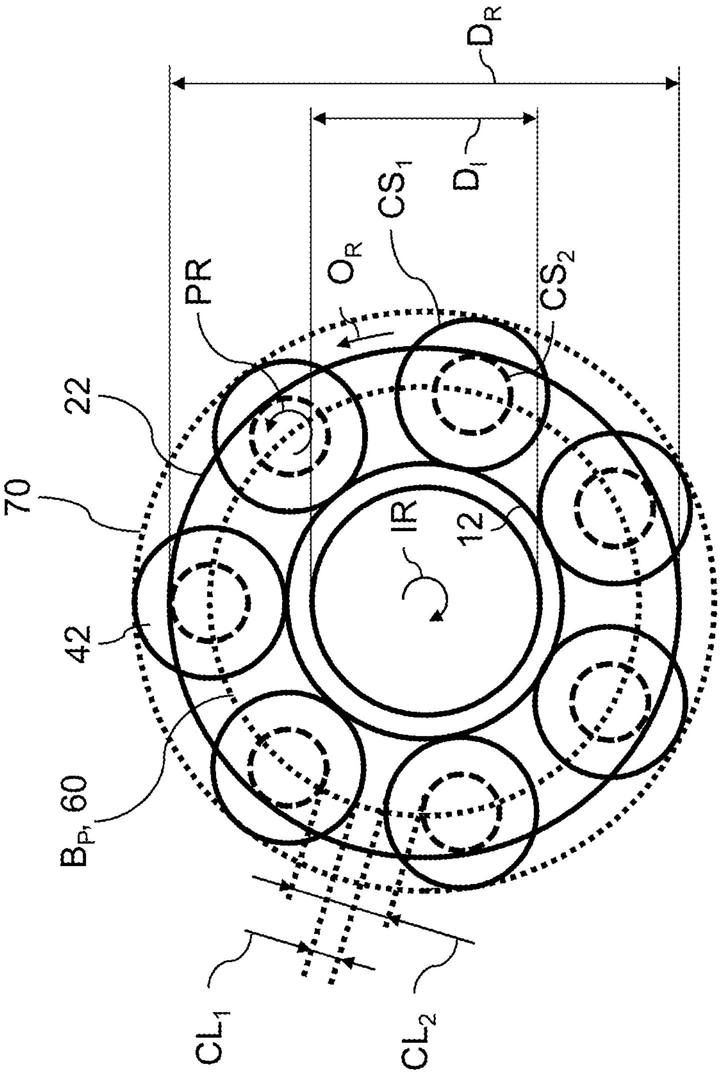
FIG. 4 shows a schematic cross sectional front view of the epicyclic gearbox of FIG. 1.

:

FIG. 4 shows a schematic front view of a reduction gearbox assembly 100, with a viewing perspective from an input side, i.e. from the input shaft 10, onto the gearbox 100. A number PN of seven planetary gears 42 are arranged rotatably in a planet carrier 60, around a circumference of the gearbox 100. Each planetary gear 42 is spaced at an equal planet axis distance $B_P$ from the rotational axis AR. Each planetary gear 42 comprises a first compound section $CS_1$, adapted to mesh with the sun gear 12, and a second compound section $CS_2$, adapted to mesh with the ring gear 22. The radially outermost extension of the torque carrying components of the gearbox assembly 100 can be defined by a planet envelope 70, which is an imaginary circular line, within which torque carrying components of the gearbox assembly 100 can fit. Each planetary gear 42 is spaced apart from its adjacent planetary gears 42 at a substantially equal distance. Due to the different diameters $D_{CS1}$, $D_{CS2}$ of the compound sections $CS_1$, $CS_2$, the first compound section $CS_1$ is spaced apart at a smaller, first circumferential clearance $CL_1$ from the first compound section $CS_1$ of the adjacent planetary gear 42, and the second compound section $CS_2$ is spaced apart at a larger, second circumferential clearance $CL_2$ from the second compound section $CS_2$ of the adjacent planetary gear 42. The planet carrier 60 is not shown in detail, but only schematized by a dotted line connecting the planetary gears 42.

Figure 5:
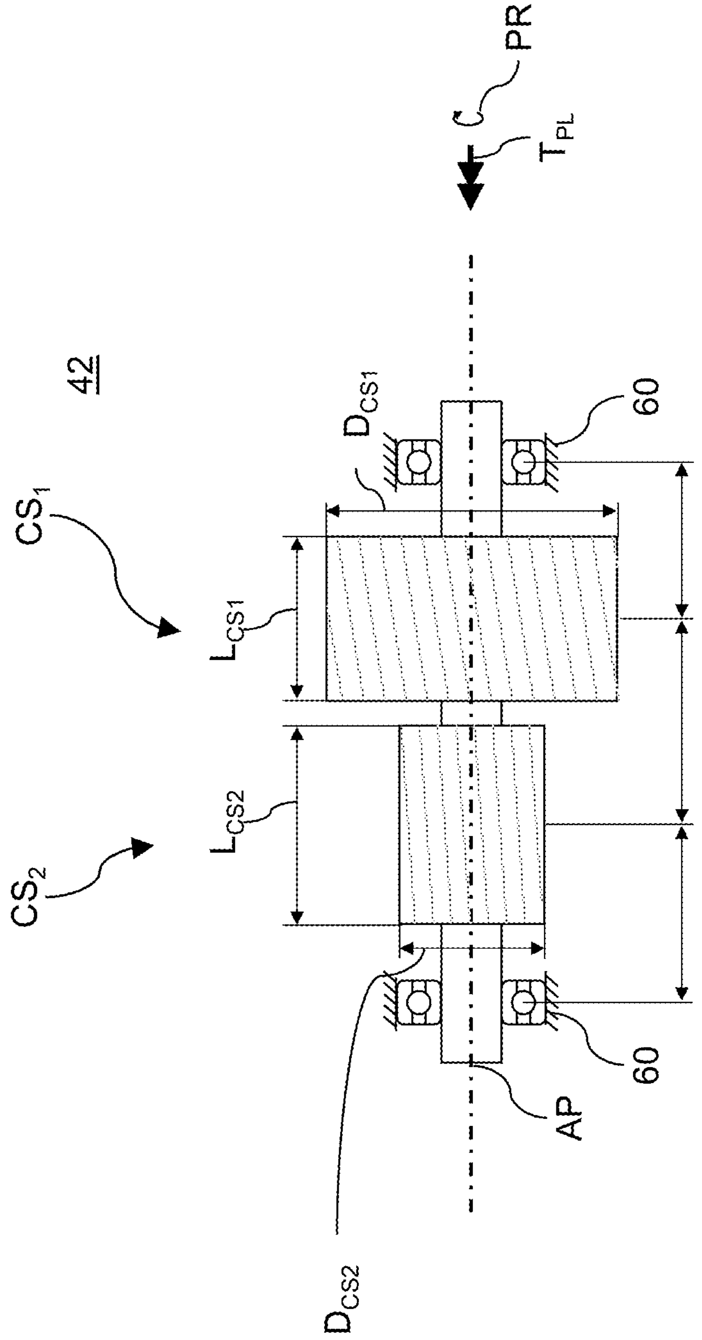
FIG. 5 shows a schematic drawing of the planetary gear for the epicyclic gearbox of FIG. 1, in a state mounted to the carrier via bearings.

Turning to FIG. 5, an example of a planetary gear 42 is shown. The planetary gear, comprising a first compound section $CS_1$ and a second compound section $CS_2$, is mounted rotatably in a planet carrier 60 via roller bearings 64.

Figure 6:
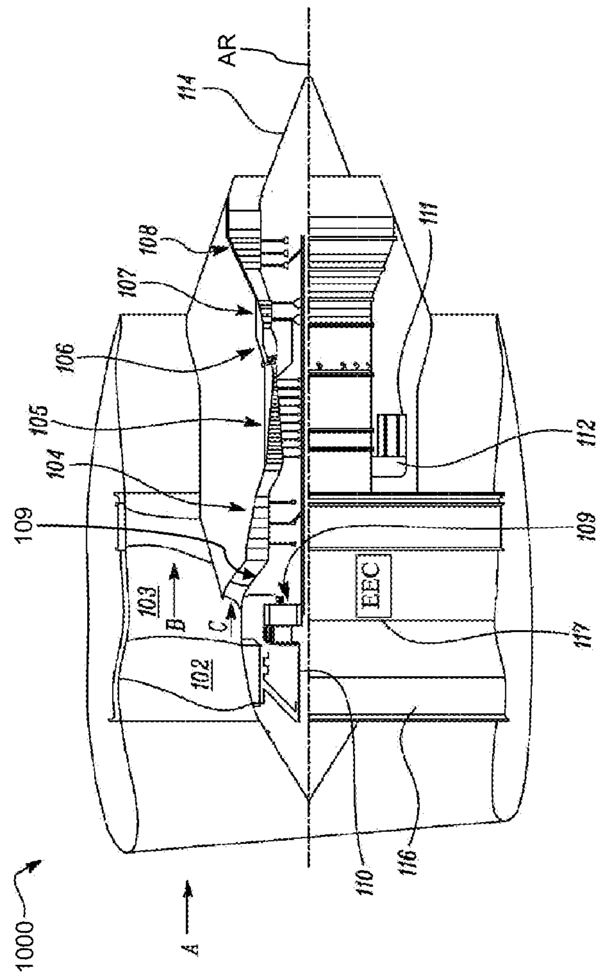
FIG. 6 shows a schematic drawing of a gas turbine engine with the epicyclic gearbox of FIG. 1.

A general arrangement of a gas turbine engine 1000 for an aircraft application is shown in FIG. 6. In the present example, the engine 1000 is of turbofan configuration, and thus comprises a ducted fan 102 that receives intake air A and generates two pressurised airflows: a bypass flow B which passes axially through a bypass duct 103 and a core flow C which enters a core gas turbine. Bypass flow B and core flow C generate an engine net thrust of the gas turbine engine 1000.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 1000. Similarly, the low-pressure compressor 104, low-pressure turbine 108, and associated interconnecting shaft form part of a low-pressure spool of the engine 1000. Such nomenclature will be familiar to those skilled in the art.

The fan 102 is driven by the low-pressure turbine 108 via a reduction gearbox in the form of a compound star-configuration epicyclic reduction gearbox assembly 100. Thus in this configuration, the low-pressure turbine 108 is connected with a sun gear of the gearbox 100. The sun gear is meshed with a plurality of planet gears located in a stationary carrier, wherein the planet gears in turn mesh with a rotating ring gear. The rotating ring gear drives the fan 102 via a fan shaft 110. It will be appreciated that in alternative examples a star-configuration epicyclic gearbox (in which the planetary gears only have a single section/stage), or a planetary-configuration epicyclic gearbox (in which the planet ring gear is static and the carrier rotates and provides the output) may be used instead. The engine 1000 includes a starter generator 111, e. g. in the form of a rotary electric machine. Such a configuration may facilitate the generation of electrical power for the engine and the aircraft and the driving of the high-pressure spool to facilitate starting of the engine. An annulus line 109, defined by a radially inner wall of the duct of the core gas turbine between its inlet and the low pressure compressor, influences the available installation space for the reduction gearbox assembly 100. In other embodiments the engine may be configured without a nacelle, which is to say the fan is open. In such embodiments, the fan and OGVs may be of much larger diameter to achieve a higher bypass ratio and hence higher propulsive efficiency. To avoid detrimentally high tip speeds, the gear ratio of the epicyclic gearbox may be increased up to the higher end of the ranges disclosed herein, for example up to 7:1 or 9:1 reduction ratio.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

LIST OF REFERENCE SIGNS (PART OF THE DESCRIPTION)

10—input shaft
12—sun gear
14—clearance space, radial clearance space
20—output shaft
22—ring gear
40—planetary stage
42—planetary gear, planet gear
44—first planetary gear stage
46—second planetary gear stage
50—through shaft
60—planet carrier
70—planet envelope
100—reduction gearbox assembly
102—fan, ducted fan
103—bypass duct
104—low-pressure compressor
105—high-pressure compressor
106—combustor
107—high-pressure turbine
108—low-pressure turbine
109—annulus line
1000—gas turbine engine
A—intake air
AR—rotational axis, rotational axis of the input shaft and the sun gear
AP—planetary axis, rotational axis of the planetary gear
B—bypass flow
$B_P$—planet axis distance
$B_W$—input shaft wall thickness
C—core flow
$CL_1$—first circumferential clearance, distance between the first compound sections of adjacent planetary gears
$CL_2$—second circumferential clearance, distance between the second compound sections of adjacent planetary gears
$CS_1$—first compound section of the planetary gear, first planetary gear stage
$CS_2$—second compound section of the planetary gear, second planetary gear stage
CR—radial centre of sun gear and/or input shaft
$D_{CS1}$—first compound section diameter, gear pitch diameter of the first compound section
$D_{CS2}$—second compound section diameter, gear pitch diameter of the second compound section
$D_I$—inner diameter of clearance space
$D_P$—planet envelope diameter
$D_R$—ring gear pitch diameter, ring gear diameter
$D_S$—sun gear pitch diameter, sun gear diameter
$F_{A\_CS1}$—axial meshing force component of the first meshing force
$F_{A\_CS1}$—axial meshing force component of the second meshing force
$F_{M\_CS1}$—first meshing force, meshing force between sun gear and first compound section
$F_{M\_CS2}$—second meshing force, meshing force between second compound section and ring gear
$F_{T\_CS1}$—tangential meshing force component of the first meshing force
$F_{T\_CS2}$—tangential meshing force component of the second meshing force
i—gear ratio
$i_1$—first gear sub-ratio, gear ratio of meshing of sun gear and first compound section
$i_2$—second gear sub-ratio, gear ratio of meshing of second compound section and ring gear
IR—input rotational movement
$L_{CS1}$—axial length of the first compound section, first compound section flank width
$L_{CS2}$—axial length of the second compound section, second compound section flank width
$L_G$—gearbox length
$N_I$—input rotational speed
$N_O$—output rotational speed
$N_P$—planet rotational speed
$O_R$—output rotational movement
$P_{Input}$—gearbox input power
PN—number of planetary gears
PR—planetary rotational movement
$T_{PL}$—torque acting on planetary gear
$\beta_{CS1}$—first helical angle, helical angle of the first compound section
$\beta_{CS2}$—second helical angle, helical angle of the second compound section
$\varepsilon$—compound flank-width-to diameter-ratio coefficient
$\tau$—installation space coefficient
$\eta$—gear ratio spread coefficient
$\sigma$—compound diameter ratio coefficient

The invention claimed is:

1. A gas turbine engine with an epicyclic reduction gearbox assembly, the epicyclic reduction gearbox assembly comprising a sun gear, configured to receive an input rotational movement from an input shaft, a ring gear, configured to provide an output rotational movement to an output shaft, a plurality of planetary gears, configured to mesh with the sun gear and the ring gear, each one of the plurality of planetary gears being configured as a compound gear, comprising a first compound section with a first compound section diameter $D_{CS1}$ and a first compound section flank width $L_{CS1}$, and a second compound section with a second compound section diameter $D_{CS2}$ and a second compound section flank width $L_{CS2}$, wherein the first compound section is arranged and configured to mesh with the sun gear, and the second compound section is arranged and configured to mesh with the ring gear, wherein a compound flank-width-to diameter-ratio coefficient ε is less than or equal to 0.7, the compound flank-width-to diameter-ratio coefficient ε being defined as $$\varepsilon = \frac{L_{CS1}}{D_{CS1}} \times \frac{D_{CS2}}{L_{CS2}}.$$

2. The gas turbine engine according to claim 1, wherein the compound flank-width-to diameter-ratio coefficient ε is greater than or equal to 0.2.

3. The gas turbine engine according to claim 1, wherein the compound flank-width-to diameter-ratio coefficient ε is in a range from 0.2 to 0.5.

4. The gas turbine engine according to claim 1, wherein a L/D ratio for the second compound section, defined as $$\frac{L_{CS2}}{D_{CS2}},$$

is less than or equal to 1.2.

5. The gas turbine engine according to claim 1, wherein there is exactly one first compound section and exactly one second compound section, and the first compound section is arranged on an input side of the gearbox assembly and/or aft of the second compound section.

6. The gas turbine engine according to claim 1, wherein the sun gear and/or the input shaft comprises at its radial centre a clearance space with an inner diameter $D_I$, the clearance space protruding axially through the sun gear and/or the input shaft.

7. The gas turbine engine according to claim 6, wherein a through shaft is arranged in the clearance space.

8. The gas turbine engine according to claim 1, wherein an overall gear ratio i of the epicyclic reduction gearbox assembly is in the range from 2.5 to 11.

9. The gas turbine engine according to claim 8, wherein the overall gear ratio i is in the range from 2.7 to 4.5.

10. The gas turbine engine according to claim 1, wherein a first gear sub-ratio $i_1$, resulting from a meshing of the sun gear and the first compound section, is in the range from 0.4 to 1.2.

11. The gas turbine engine according to claim 10, wherein the first gear sub-ratio $i_1$ is in the range from 0.5 to 1.0.

12. The gas turbine engine according to claim 1, wherein a second gear sub-ratio ($i_2$), resulting from a meshing of the second compound section and the ring gear, is in the range from 3 to 8.

13. The gas turbine engine according to claim 12, wherein the second gear sub-ratio $i_2$ is in the range from 4 to 7.

14. An epicyclic reduction gearbox assembly comprising a sun gear, configured to receive an input rotational movement from an input shaft, a ring gear, configured to provide an output rotational movement to an output shaft, a plurality of planetary gears, configured to mesh with the sun gear and the ring gear, each one of the plurality of planetary gears being configured as a compound gear, comprising a first compound section with a first compound section diameter $D_{CS1}$ and a first compound section flank width $L_{CS1}$, and a second compound section with a second compound section diameter $D_{CS2}$ and a second compound section flank width $L_{CS2}$, wherein the first compound section is arranged and configured to mesh with the sun gear, and the second compound section is arranged and configured to mesh with the ring gear, wherein a compound flank-width-to diameter-ratio coefficient ε is less than or equal to 0.7, the compound flank-width-to diameter-ratio coefficient being defined as $$\varepsilon = \frac{L_{CS1}}{D_{CS1}} \times \frac{D_{CS2}}{L_{CS2}}.$$

* * * * *